(12) United States Patent
Saldanha et al.

(10) Patent No.: US 10,645,176 B2
(45) Date of Patent: May 5, 2020

(54) SYSTEM AND METHOD TO PROCESS PACKETS IN A TRANSMISSION CONTROL PROTOCOL SESSION

(71) Applicant: Cyphort Inc., Santa Clara, CA (US)

(72) Inventors: Anoop Wilbur Saldanha, Mangalore (IN); Marshall Ha, San Jose, CA (US)

(73) Assignee: Cyphort Inc., Santa Clara, CA (US)

( * ) Notice: Subject to any disclaimer, the term of this patent is extended or adjusted under 35 U.S.C. 154(b) by 237 days.

(21) Appl. No.: 15/850,498

(22) Filed: Dec. 21, 2017

(65) Prior Publication Data

US 2018/0191835 A1 Jul. 5, 2018

(30) Foreign Application Priority Data

Dec. 29, 2016 (IN) .............................. 201611044894

(51) Int. Cl.
*G06F 15/173* (2006.01)
*H04L 29/08* (2006.01)
*H04L 29/06* (2006.01)

(52) U.S. Cl.
CPC .......... *H04L 67/142* (2013.01); *H04L 69/161* (2013.01); *H04L 69/163* (2013.01); *H04L 69/166* (2013.01); *H04L 69/22* (2013.01)

(58) Field of Classification Search
CPC ... H04L 67/142; H04L 69/161; H04L 69/163; H04L 69/22
USPC ........................................................ 709/230
See application file for complete search history.

(56) References Cited

U.S. PATENT DOCUMENTS

| 2004/0044796 | A1* | 3/2004 | Vangal | H04L 69/16 709/250 |
| 2004/0143655 | A1* | 7/2004 | Narad | H04L 45/16 709/223 |
| 2013/0205037 | A1* | 8/2013 | Biswas | H04L 47/365 709/232 |
| 2016/0105469 | A1 | 4/2016 | Galloway et al. | |

OTHER PUBLICATIONS

Extended European Search Report corresponding to EP 18150090.1 dated Apr. 9, 2018, 7 pages.

\* cited by examiner

*Primary Examiner* — Atta Khan
(74) *Attorney, Agent, or Firm* — Harrity & Harrity, LLP

(57) ABSTRACT

A device may include one or more memories and one or more processors communicatively coupled to the one or more memories to: receive a plurality of data packets of a Transmission Control Protocol (TCP) session; determine that a particular TCP segment, of the TCP session that includes a synchronization acknowledgment (SYN-ACK) flag, has been received before a corresponding TCP segment of the TCP session that includes a synchronization (SYN) flag; store a sequence number of the particular TCP segment as an initial sequence number for a stream of the TCP session; and reassemble or rearrange a set of data packets of the TCP session based on the initial sequence number for the stream and based on one or more sequence numbers of the set of data packets.

20 Claims, 5 Drawing Sheets

SYSTEM AND METHOD TO PROCESS PACKETS IN A TRANSMISSION CONTROL PROTOCOL SESSION

RELATED APPLICATION(S)

This application claims priority under 35 U.S.C. § 119 to Indian Patent Application No. 201611044894, filed on Dec. 29, 2016, the content of which is incorporated by reference herein in its entirety.

BACKGROUND

Network devices communicate over a network using one or more communication protocols. For example, one of the communication protocols used over packet networks, such as those using the Internet protocol (IP), is transmission control protocol (TCP). TCP is used to ensure that all bytes transmitted by an originating (source) network device are received at a destination network device. A TCP traffic flow is divided into segments which each includes a TCP header and a chunk of data from a data stream. In some networks, a network device that parses TCP segments in data packets is sometimes implemented in a location where data packets in two directions of a data stream (e.g., the receive path and the send path, the two flows in a TCP session) are interlocked. For example, a network device that parses TCP segments may be implemented on the client or server, or may be implemented inline with the TCP traffic flow.

SUMMARY

A device may include one or more memories and one or more processors communicatively coupled to the one or more memories to: receive a plurality of data packets of a Transmission Control Protocol (TCP) session; determine that a particular TCP segment, of the TCP session that includes a synchronization acknowledgment (SYN-ACK) flag, has been received before a corresponding TCP segment of the TCP session that includes a synchronization (SYN) flag; store a sequence number of the particular TCP segment as an initial sequence number for a stream of the TCP session; and reassemble or rearrange a set of data packets of the TCP session based on the initial sequence number for the stream and based on one or more sequence numbers of the set of data packets.

A method, performed by a network device, to process data packets in a TCP session may include: receiving a plurality of data packets; generating a modified TCP state machine for each direction of one or more data streams of the TCP session based on one or more values in at least one data packet of the plurality of data packets, the at least one data packet including a TCP segment; analyzing the TCP segment of the at least one data packet for one or more flags to generate a determination that the TCP segment includes a synchronization acknowledgment (SYN-ACK) flag before another determination that another TCP segment for the TCP session includes a synchronization (SYN) flag; based on the determination that the TCP segment includes a SYN-ACK flag before the other determination that the other TCP segment for the TCP session includes the SYN flag, storing a sequence number of the TCP segment as an initial sequence number for a server stream; and reassembling a set of the plurality of data packets based on sequence numbers of the set of the plurality of data packets, where the sequence numbers of the set of the plurality of data packets are less than a last acknowledgment sequence number for a corresponding direction.

A non-transitory computer-readable medium may store one or more instructions that, when executed by one or more processors of a device, cause the one or more processors to: receive a plurality of data packets of a TCP session; determine that a particular TCP segment of the TCP session that includes a SYN-ACK flag has been received before a corresponding TCP segment of the TCP session that includes a SYN flag; store a sequence number of the particular TCP segment as an initial sequence number for a stream of the TCP session; and reassemble or rearrange a set of data packets of the TCP session based on the initial sequence number for the stream and based on one or more sequence numbers of the set of data packets.

DETAILED DESCRIPTION

Figure 1:
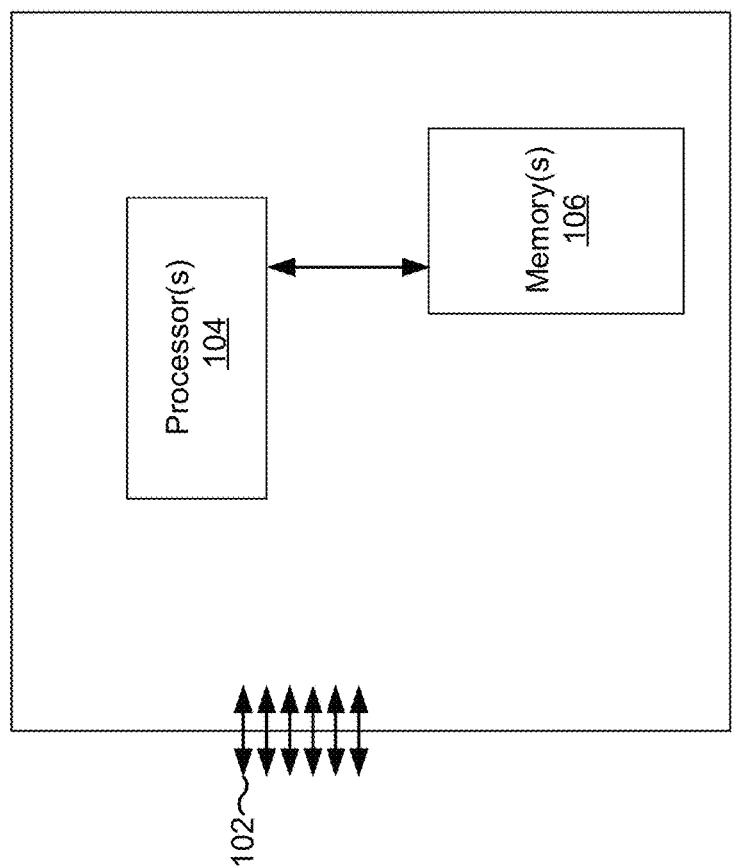
FIG. 1 is a block diagram of a network device configured to generate a TCP state machine described herein.

The following detailed description of example implementations refers to the accompanying drawings. The same reference numbers in different drawings may identify the same or similar elements.

A TCP session may be associated with various states, such as a closed state, a listen state, a synchronization state, an established or steady state, a closed state, and so on. A network device may monitor a TCP session to build or recreate states of the TCP session based on traffic associated with the TCP session. A recreation (e.g., simulation, determination, etc.) of states of a TCP session may be referred to as a state machine, a TCP state machine, a finite state machine, or a similar term. TCP state machines may be useful to detect anomalous behavior in a TCP session. For example, if the TCP session performs a transition from one state to another, that transition may be compared to a TCP state machine to determine whether the transition deviates from expected behavior of the TCP state machine.

A network device that monitors a TCP session and builds a state machine for a TCP session may need to process data packets (e.g., TCP segments) in the same order that the data packets are exchanged between a client and a server to correctly recreate the TCP state for the TCP session. For such a system, a response data packet in one direction may not be processed before a corresponding data packet in another direction. This is because the corresponding data packet may be necessary in order for the destination to generate a response data packet in the first place. However, data packets transmitted in a network can be received out of order by any network device that monitors the communication, thus reducing reliability and performance of TCP monitoring, and which can even result in a loss of function of the network device.

Some implementations described herein process packets in a transmission control protocol (TCP) session to generate a modified TCP state machine for each direction of a data stream associated with the TCP session. Some implementations described herein may process TCP segments for each data stream of the TCP session such that TCP segments received out of order do not result in the TCP state machine malfunctioning. Because the network device is configured to process, generate and store information for a data packet in one direction of the TCP session, where the packet received might be received out of order and prematurely, the TCP session will not cause an error, as might occur with a network device that does not generate a modified TCP state machine in each direction and which errors out on seeing an out of order packet. Thus, the network device is configured to continue to process the data packets received for the TCP session, which enables the network device to process the data packets for a TCP session out of order. In this way, the network device is more tolerant of network disturbances that can result in receiving out of order packets, which results in a more efficient implementation because the network device does not cause an error and/or request retransmission of the data packets in the TCP session that have already been sent.

FIG. 1 is a diagram of an overview of a network device 100 described herein. Network device 100 is a router, a gateway, a firewall, a proxy server, an edge device, and/or the like. As shown in FIG. 1, a network device 100 includes a plurality of ports 102 for receiving and transmitting a plurality of data packets using techniques including those known in the art. The ports 102 are coupled with one or more processors 104 and one or more memories 106, for example, through one or more busses. A memory 106 may include a dynamic random-access memory (DRAM), a static random-access memory (SRAM), a flash memory, and/or another technology used to store data. The memory 106 may be coupled with the one or more processors 104. A processor 104 may include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component.

In some embodiments, the network device 100 described herein may be implemented as a network interface card (NIC). In some implementations, the network device may be a physical device implemented within a housing, such as a chassis. In some implementations, the network device may be a virtual device implemented by one or more computer devices of a cloud computing environment or a data center.

The one or more processors 104 may be configured to manage access to the one or more memories 106. For example, the one or more processors 104 may be configured to determine a location in the one or more memories 106 to store data packets received on one or more ports 102. The one or more processors 104 may be configured to read data packets or portion(s) thereof stored in the one or more memories 106 when the data packets or portion(s) thereof are to be transmitted on one or more ports 102 or analyzed by the one or more processors 104. The one or more processors 104 may be configured to overwrite, update, and/or invalidate memory locations.

Further, the one or more processors 104 may be configured to analyze the data packets received for TCP segments and the TCP header to determine the state of one or more data streams between network devices (e.g., one or more connections or flows of a TCP session between a client and a server). The TCP segments can be encapsulated in an Internet Protocol (IP) datagram that includes an IP header and data section to form a data packet. The IP datagram may be transmitted over an IP communication network.

In some implementations, the one or more processors 104 are configured to analyze a TCP header in a data packet to determine a state of a connection between network devices. The one or more processors may be configured to determine a state of each direction of a TCP session between the network devices based on one or more of a sequence number, an acknowledgment number, a control bit in a TCP header (sometimes referred to herein as flag), and/or other information contained in a TCP header and an IP header.

Based on the determined state of the TCP session or connection, the one or more processors 104 may generate and update a modified TCP state machine of one or more data streams. For example, the one or more processors 104 may be configured to store state information, such as variables, in a memory 106 and to initialize and to update variables based on information contained in a TCP header. The state information may include, but is not limited to, a sequence number, a direction of the flow (e.g., a client stream (client-originating stream) versus a server stream (server-originating stream)), a last byte sequence number (last_seq), a last seen acknowledgement (ACK) value, a base sequence (base_seq) variable, and/or other information that is used to set state information or initialize variables for a TCP session.

As used herein, a modified TCP state machine refers to a TCP state machine that is based on the sequence number, the direction of the flow, the last byte sequence number, the last seen ACK value, the base sequence, and/or the like. For example, the modified TCP state machine may be modified from a legacy or known TCP state machine that describes TCP states and/or transitions between TCP states. The modified TCP state machine may include or identify the information needed to determine out of order packets, wherein one such form of information can be an ACK that has been received before a corresponding message. Further, the modified TCP state machine may include or identify information needed to reassemble a plurality of data packets based on determining that the ACK has been received before the corresponding message, as described in more detail below.

In some implementations, the one or more processors 104 may store values or set flags in memory 106 using techniques including those known in the art to update the state information of a TCP state machine. For example, the one or more processors 104 may receive a data packet that includes a SYN flag as a first data packet of a TCP session. The one or more processors 104 may determine that the data packet is a client data packet from a client stream of the TCP session (e.g., may determine that the data packet is flowing from the client to the server), and may store a sequence number of the data packet, included in the TCP header, as the initial sequence number (ISN) for the client stream.

In another example, the one or more processors 104 may be configured to determine that a data packet that includes a SYN-ACK flag is a server packet (e.g., a packet of a server stream of the TCP session). Based on this determination and after analyzing a TCP header of the data packet, the one or more processors 104 may be configured to store the ISN for the server stream using a sequence number in the TCP header to set the ISN for the server stream.

If the data packet with the SYN-ACK flag is the first packet received for a TCP session, the one or more processors 104 may be configured to determine the ISN for the client stream using an acknowledgement value in the data packet. Moreover, the one or more processors 104 may be configured to determine that the data packet direction is from a server to a client (e.g., that the data packet is included in a server stream) despite being the first packet seen for the TCP session, and to store a value or flag in memory 106 to designate the direction of the data packet. This direction value or flag used to designate the direction of the data packet is used, in some implementations, to inform one or more other modules that reassemble data packets of a TCP session to a correct order, as transmitted by an originating device (e.g., client, server, or network device).

In some implementations, the one or more processors 104 may be configured to analyze a TCP header of a data packet to determine if the data packet, received for a TCP session, has a finish (FIN) flag set. Based on a determination that a FIN flag is included or set in the data packet, the one or more processors 104 may update the state of the TCP state machine for a TCP session by storing a FIN value or flag in memory 106.

In some implementations, the one or more processors 104 may be configured to analyze a TCP header to determine whether a data packet received for a TCP session has a reset (RST) flag set. Based on a determination that a RST flag is included in the data packet, the one or more processors 104 may update the state of the TCP state machine by storing an RST value or flag in memory 106.

In some implementations, the one or more processors 104 may be configured to analyze a TCP segment for one or more data packets and to generate information based on information contained in a TCP header of the TCP segment. The one or more processors 104 may be configured to generate state information based on or for the information in the TCP header. For example, the one or more processors 104 may be configured to analyze a TCP header and determine if the TCP header includes a SYN-ACK flag in the first data packet received for a TCP session, as opposed to a SYN flag, which, under the TCP protocol, should be included in the first data packet of a TCP session. In some implementations, the one or more processors 104 may be configured to generate the ISN for a server stream based on an acknowledgment number (ACK value) in the TCP header of a packet from a client stream. Moreover, if the TCP header includes a SYN-ACK flag in the first data packet received for the TCP session, the one or more processors 104 may be configured to determine that the data packet is from the server stream and to store a value to tag the direction of the data packet and to tag the data stream of the packet as that from server to the client (e.g., as a server stream).

The one or more processors 104 may be configured to analyze a TCP header to determine if a data packet received in a TCP session has a FIN flag set. Based on a determination that the FIN flag is included or set in the data packet, the one or more processors 104 may be configured to generate the sequence number of the last byte of data for the corresponding direction of the flow of the TCP session. The one or more processors 104 may generate the sequence number based on combining a sequence number in the TCP header of the data packet and a payload length of the data packet, as included with the TCP header of the data packet. The one or more processors 104 may be configured to store this generated value of the last byte sequence number (e.g., in a variable called last_seq or in a variable with a different name) in the memory 106.

The one or more processors 104, according to some implementations, may be configured to analyze a TCP header to determine if a data packet received for a TCP session has an RST flag set. Based on a determination that an RST flag is included or set in the data packet, the one or more processors 104 may be configured to generate the sequence number of the last byte of data for the corresponding direction of the flow of the TCP session. The one or more processors 104 may generate the sequence number based on combining the sequence number in the TCP header of the data packet and a payload length of the data packet, as included with the TCP header of the data packet. The one or more processors 104 may be configured to store this determined value (e.g., in a variable called last_seq or in a variable with a different name) in the memory 106.

In some implementations, the one or more processors 104 are configured to use the determined ISN as a value for a base sequence (base_seq) variable. For example, the determined ISN may be for a particular stream or direction of flow for a TCP session. The base_seq variable (e.g., the base sequence variable) may be used to indicate the byte value of the data up to the TCP segments that have been reassembled. Based on the base_seq value, the one or more processors 104 may be configured to generate a next byte of data from which reassembly of the segments should continue (e.g., based on adding one to the base_seq value (e.g., base_seq+1)).

In some implementations, the network device 100 may be configured to continue to analyze data packets for the TCP session without erroring out or throwing out the packet, when the network device 100 identifies an ACK flag corresponding to a TCP segment that has not yet been received. For example, the one or more processors 104 may be configured to store, in memory 106, an acknowledgment number of the TCP segment, including the ACK flag, as a last seen ACK value for the direction/stream of the TCP session that is being ACK'ed, if the ACK value is greater than the highest ACK value detected thus far for that direction/stream of the TCP session, or if no ACK value has been stored yet for that direction/stream of the TCP session, the one or more processors 104 may continue to process the TCP payload in the data packet.

In some implementations, the network device 100 is configured to reassemble the data packets of a TCP session, regardless of an order in which the data packets are received (e.g., even if the data packets are received in a wrong order). In some implementations, the one or more processors 104 are configured to reassemble the received data packets up to the last acknowledged byte of data received for a direction/stream of a TCP session. In some implementations, the one or more processors 104 may be configured to not cause an error, and to continue analyzing and storing state information of other TCP segments contained in data packets received, despite the data packets holding an acknowledged value for a TCP segment from the opposite direction that has not yet been received. Because the network device 100 is configured to not cause an error and to continue to process out-of-order data packets that contain an acknowledgement value for a TCP segment from the opposite direction that has not yet been received, the network device 100 may not generate an error for data packets that claim to acknowledge bytes/segments that have not been seen/received yet, and, instead, may extract and store the information from the TCP segment and update the state machine for the TCP session accordingly. In this case, the network device 100 may be configured to wait for a next TCP segment to arrive (e.g., in an incorrect order). According to some implementations, when the network device 100 receives the TCP segment that has caused a gap in the byte stream of a direction of a TCP session, the network device 100 is configured to continue reassembly of newly received TCP segments, and to continue reassembly of the TCP segments from the byte up to which the network device 100 has previously performed reassembly. In this case, the newly received TCP segment may fill the gap.

Reassembling the data packets of a TCP session and transmitting the data packets in the correct order may be useful for network devices that receive a copy of all client-server communications, and for network devices that use multiple receive (RX) rings to achieve high performance. In such a configuration, a network device may frequently process data packets of the two directions/streams out of order. For example, some communication systems may use an asymmetric hash function to distribute traffic (e.g., an asymmetric receive side scaling (RSS) hash function and/or the like), which may result in the two flows/directions of the same TCP session being received by different RX rings. This may cause out-of-order reception of TCP segments. Thus, some implementations described herein may be useful for processing such a TCP session, since such implementations may not malfunction when an out-of-order TCP segment is received.

As another example, a network device arranged in a network between a source network device (such as a client) and a destination network device (such as a server) of a TCP session may be referred to as an intermediate network device. Such an intermediate network device may function as a SPAN, a TAP, a MIRROR, and/or the like. An intermediate network device can reorder data packets across the two directions/streams of the TCP session through reassembling the data packets, resulting in data packets in one flow/direction of a TCP session acknowledging unseen bytes/segments from the opposite direction/stream of the same TCP session, as discussed above.

Thus, implementations of the network device reduce malfunction when processing a TCP session when an ACK for a TCP segment of the TCP session has been received out of order from a corresponding SYN packet, or if an ACK is received before the corresponding data packet is seen. Furthermore, some implementations described herein improve efficiency by reducing malfunctioning based on data packets that are received out of order, or in a wrong order from that originally transmitted by an originating device, which may be particular useful with communication systems involving multiple receive rings. Thus, the network devices, as described herein, improve packet-processing performance and processor load distribution because the network devices are able to receive data packets from multiple RX rings in any order. This, in turn, may improve scalability of the communication system.

As indicated above, FIG. 1 is provided merely as an example. Other examples are possible and may differ from what was described with regard to FIG. 1.

Figure 2:
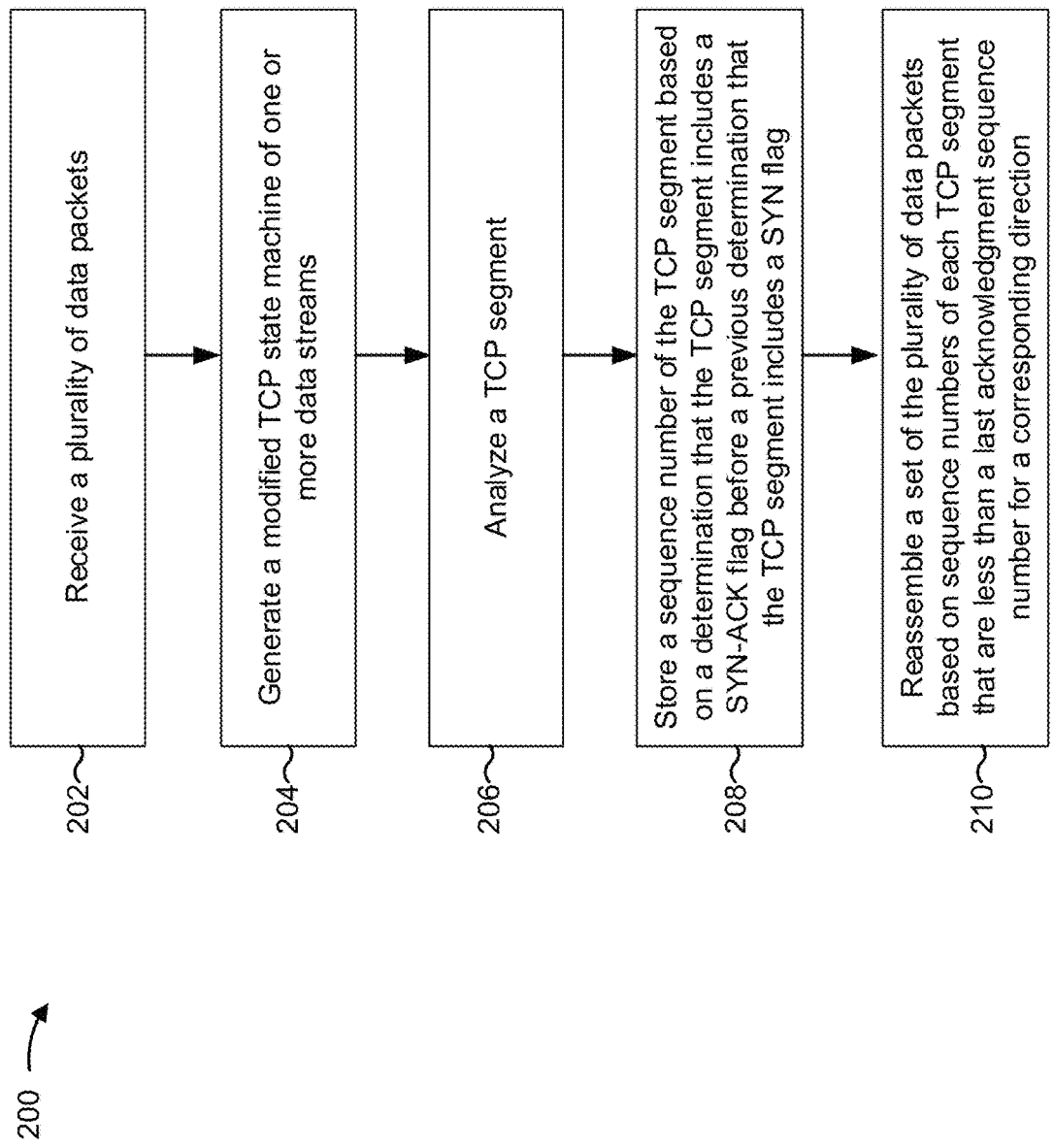
FIG. 2 is a flow diagram of a method to process a TCP session as described herein.
Figure 3:
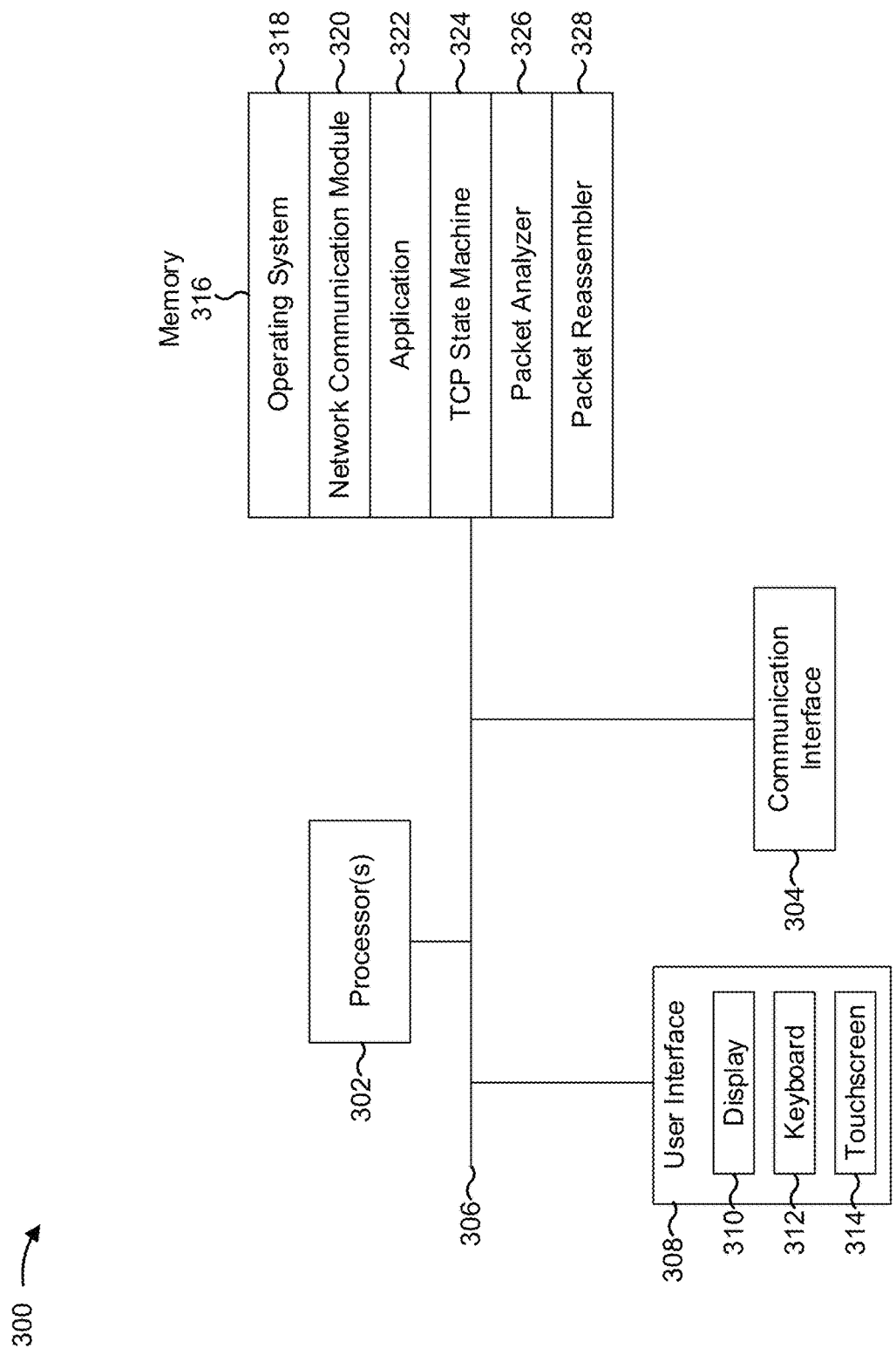
FIG. 3 is a diagram of a system to process a TCP session as described herein.

FIG. 2 is a flow chart of an example process 200 for processing a TCP session associated with out-of-order TCP sequences. In some implementations, one or more process blocks of FIG. 2 may be performed by network device 100 (FIG. 1) or system 300 (FIG. 3).

As shown in FIG. 2, process 200 may include receiving a plurality of data packets (block 202) using techniques including those known in the art. As further shown in FIG. 2, process 200 may include generating a modified TCP state machine of one or more data streams (block 204) using techniques including those described herein. As further shown in FIG. 2, process 200 may include analyzing a transmission control protocol segment (block 206) using techniques including those described herein. As an example, pseudo code is described below to implement a part of process 200, that involves receiving the initial TCP handshake in the wrong order, and also to store the ACK values in a packet, even if the packet is received out of order.

The below pseudocode explains a part of process 200 that involves receiving the TCP handshake, regardless of whether the TCP handshake is in the correct order or the incorrect order. If the packet received is a SYN-ACK packet and if the server stream state is not initialized yet, the details or information in the TCP packet and header may be used to initialize the server stream state. If the client stream is not initialized, it is an indication that this SYN-ACK packet may be the first packet seen for this TCP session, and the TCP packet and header may be used to initialize the client stream state. Any flags may also be reversed to indicate that the direction of this particular packet received is the server to client packet or direction and not client to server packet or direction, since the packet might otherwise be tagged as client to server packet, as the packet is the first packet seen for the TCP session. Similarly, if the packet seen is a SYN packet only, the packet may be used to initialize the client server stream if the client server stream hasn't been initialized yet. If the packet is an ACK packet, we use the packet to update the last_ack variable in memory for the opposite stream direction, if the packet's ACK value is greater than the value in memory Process (Packet, Flow)

```
{
If TO_SERVER(Packet)
    Stream = client_stream
    Opposite_Stream = server stream
Else
    Stream = server stream
    Opposite_Stream = client_stream
If (IS_SYN_ACK(Packet))
    If (!IS_INITIALISED(server_stream)
        INITIALISE( server_stream)
        If (!IS_INITIALIZED(client_stream)
            INITIALISE(client_stream)
            REVERSE_DIRECTION(Flow)
            REVERSE_DIRECTION(Packet)
Else If (IS_SYN(Packet))
    If (!(IS_INITIALISED(client_stream))
        INITIALISE(client_stream)
If (IS_ACK(Packet) && Opposite_Stream.Last_Acked_Value < Packet.Ack_Value)
        Opposite_Stream.Last_Acked_Value = Packet.Ack_Value
}.
```

As further shown in FIG. 2, process 200 may include storing a sequence number of the TCP segment based on a determination that the TCP segment includes a SYN-ACK flag before a previous TCP packet that is a SYN packet (block 208). For example, when the network device determines that the TCP segment that includes the SYN-ACK flag has been received before a corresponding TCP segment that includes a SYN flag, the network device may store a sequence number of the TCP segment as an initial sequence number for the server stream. As further shown in FIG. 2, process 200 may include reassembling a set of the plurality of data packets based on sequence numbers of each TCP segment that are less than a last acknowledgment sequence number for that corresponding direction (block 210). For example, the network device may rearrange the set of data packets based on sequence numbers of the set of data packets. The network device may rearrange the set of data packets by placing data packets, that have a lower sequence number than a last-received acknowledgment sequence number, before an acknowledgment TCP segment associated with the acknowledgment sequence number.

As an example, pseudo code that implements a part of the solution that implements the reassembly of a set of data packets may include the following: The below pseudo shows an example of how processing may happen for a TCP stream. Each stream holds segments in a list Stream.Segment_List, where segments are arranged in an increasing order of their sequence numbers. The stream.Next_Seq holds the value of the sequence number for the byte from which reassembly should continue for the TCP stream. A variable called Next_Seq is updated as segments are processed and updates the stream.Next_Seq variable. Next_Seq holds the current sequence number up to which reassembly is complete. For every segment in the segment list, if the segment is greater than the last_acked value, it indicates that the segment hasn't been acknowledged yet, and no more segments may be processed after the segment that is greater than the last_acked value. Next, if the segment to be processed holds bytes that are completely before the Next_Seq variable, it indicates that the segment has already been processed and the code continues to the next segment in the list. If the segment's SEQ is greater than Next_Seq, it indicates that a segment is missing in the list, thus indicating a gap in the stream, and processing of any more segments is discontinued until a new segment is received to fill this gap. If all these conditions are met, it indicates that the segment holds bytes, that includes the next byte to be processed indicated by the value in Next_Seq. Thus, this segment is processed in the upper layer, and the Next_Seq value is correspondingly updated.
Reassemble(Stream)

```
{
    Segment_List = Stream.Segment_List
    Next_Seq = Stream.Next_Seq
    FOR EACH Segment IN Segment_List
        IF (Segment.SEQ > Stream.Last_Acked_Value)
            BREAK
        IF (Segment.SEQ + Segment.Payload_Len < Next_Seq)
            CONTINUE
        IF (Segment.SEQ > Next_Seq)
            BREAK
        Process_Segment_Upper_Layer(Segment)
        Stream.Next_Seq = Next_Seq
}.
```

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

FIG. 3 is a diagram of an example system 300 configured to perform, for example, example process 200 shown in FIG. 2. As shown, system 300 may include one or more processors 302, one or more communications interfaces 304, a memory 316, and one or more communication buses 306 for interconnecting these components. System 300 may include a user interface 308 comprising a display device 310, a keyboard 312, a touchscreen 314, and/or another input and/or output device. In some implementations, memory 316 may include high speed random access memory and/or non-volatile memory, such as one or more magnetic or optical storage disks. In some implementations, memory 316 may include mass storage that is remotely located from processor 302. Moreover, memory 316, or alternatively one or more storage devices (e.g., one or more nonvolatile storage devices) within memory 316, includes a non-transitory computer-readable medium. Memory 316 may store at least one of the following elements and/or one or more other elements:

an operating system 318 that includes procedures for handling various basic system services and for performing hardware dependent tasks;

a network communication module 320 (or instructions identifying a network communication module) that is used for communication between system 300 and other computers, clients, servers, network devices, systems, or devices via the one or more communications interfaces 304 and/or one or more communications networks, such as the Internet, other wide area networks, local area networks, metropolitan area networks, and other type of networks;

an application module 322, which may include a web browser, a document viewer, or another application for performing at least any one of analyzing information, receiving data packets, and transmitting data packets;

a TCP state machine module 324 to generate a state machine for one or more TCP sessions and to update the state of one or more streams of a TCP session using techniques including those described herein;

a packet analyzer module 326 to analyze data packets received for a TCP segment including a TCP header and payload, and to make a determination of state information and variable values for each stream of the TCP session using techniques including those described herein; and a packet reassembler module 328 to reassemble or rearrange a TCP stream of a TCP session in an order as transmitted by an originating (source) network device using techniques including those described herein.

As indicated above, FIG. 3 is provided merely as an example. Other examples are possible and may differ from what was described with regard to FIG. 3.

Figure 4:
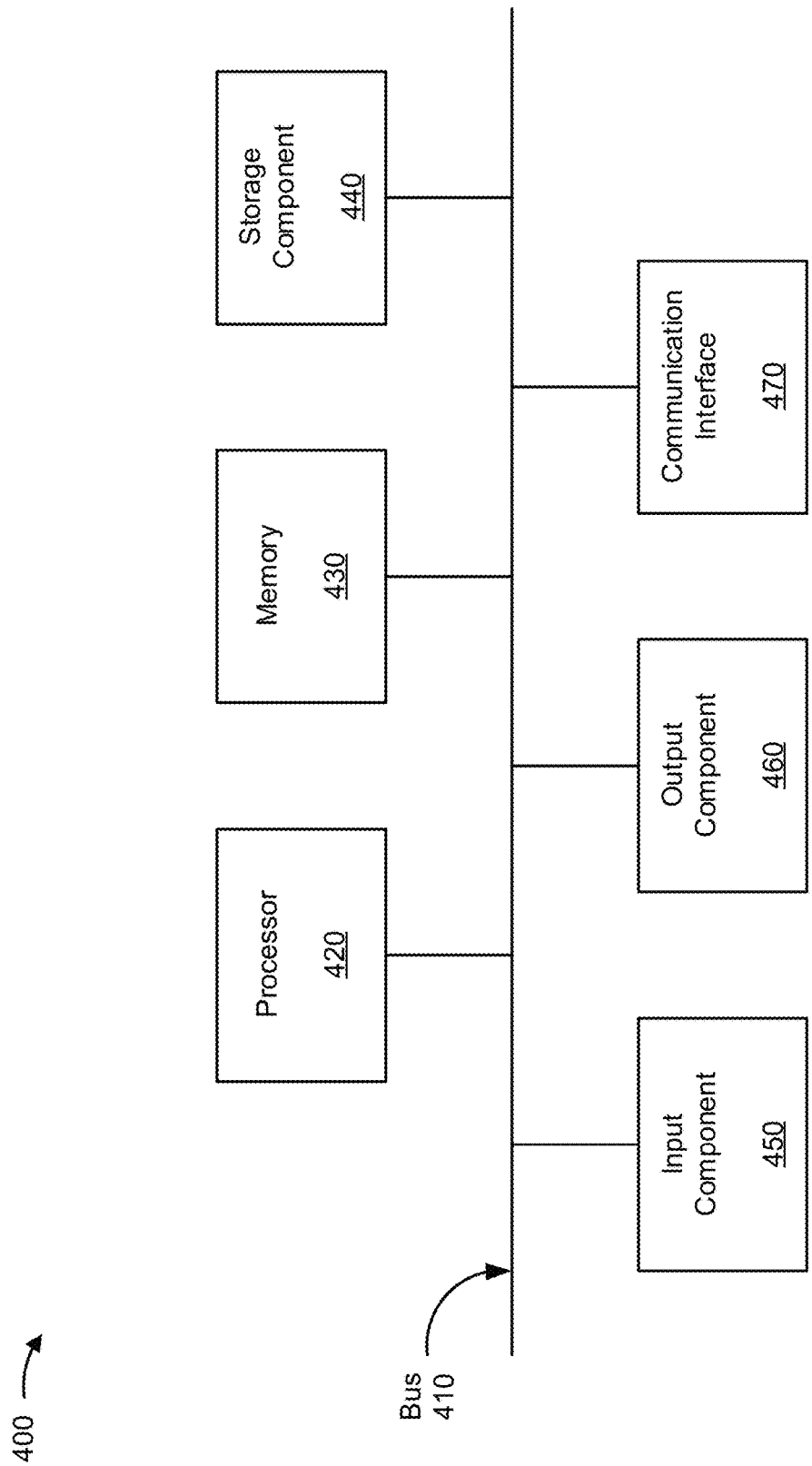
FIG. 4 is a diagram of example components of one or more devices of FIG. 1, 3, and/or 5.

FIG. 4 is a diagram of example components of a device 400. Device 400 may correspond to network device 100 and/or system 300. In some implementations, network device 100 and/or system 300 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
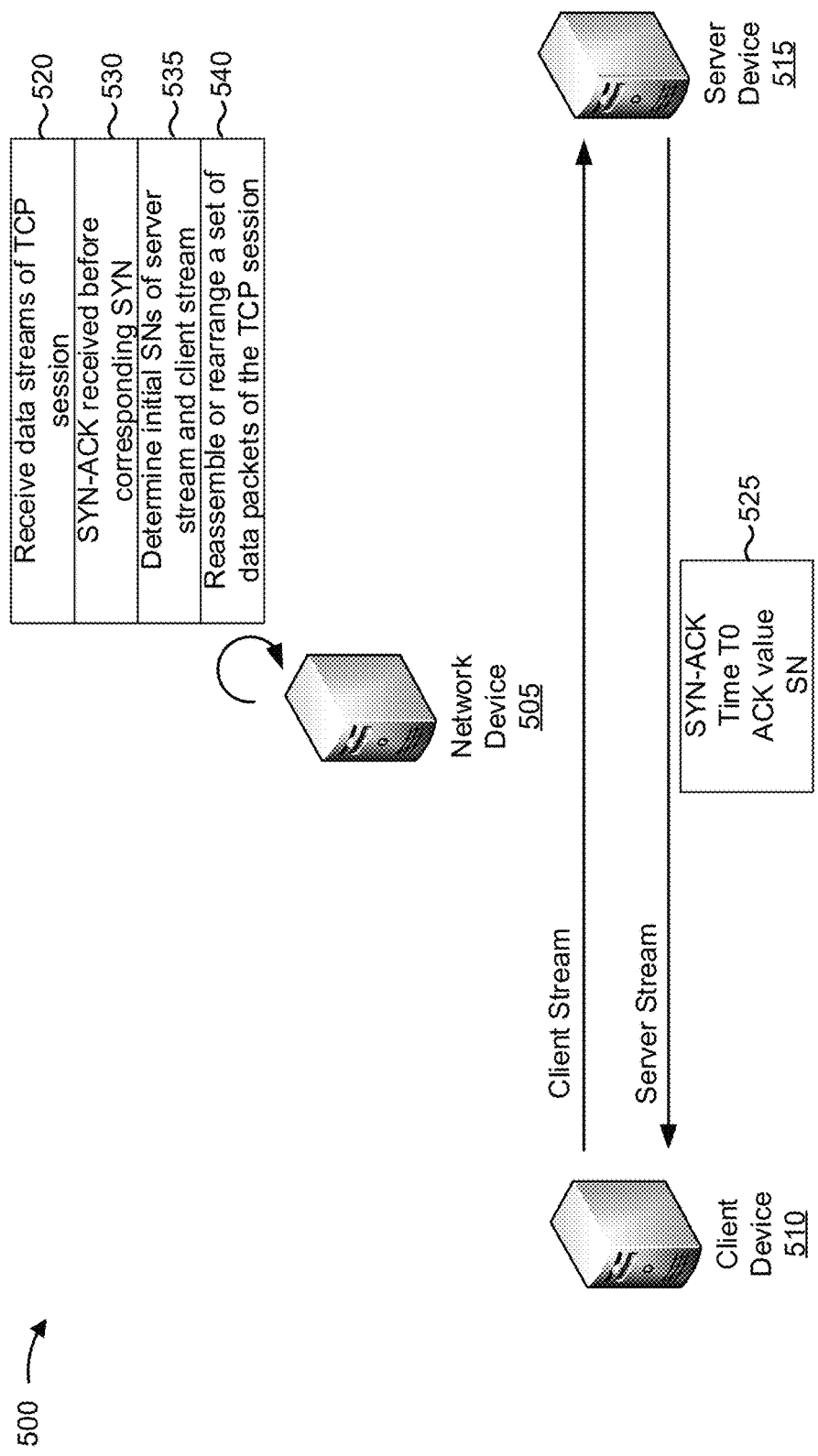
FIG. 5 is a diagram of an example implementation relating to the example process shown in FIG. 3.

FIG. 5 is a diagram of an example implementation 500 relating to example process 200 shown in FIG. 2. FIG. 5 shows an example of reassembling or rearranging a set of data packets of a TCP session based on an out-of-order ACK. As shown, FIG. 5 includes a network device 505, a client device 510, and a server device 515. Network device 505, client device 510, and/or server device 515 may correspond to or include one or more components of network device 100, system 300, and/or device 400. Client device 510 and server device 515 may be associated with a TCP session, which may include (as shown) a client stream from client device 510 to server device 515 and a server stream from server device 515 to client device 510. Network device 505 may monitor the TCP session. For example, network device 505 may receive data packets of the client stream as well as data packets of the server stream. In some implementations, network device 505 may be part of multiple different RX rings associated with client device 510 and server device 515.

As shown in FIG. 5, and by reference number 520, network device 505 may receive data streams of the TCP session (e.g., the client stream and the server stream). As shown by reference number 525, network device 505 may receive a SYN-ACK message or data packet at a time T0. As further shown, the SYN-ACK message or data packet may identify an ACK value, which may identify a corresponding SYN message or data packet associated with the SYN-ACK message or data packet. For example, the corresponding SYN message or data packet may have been transmitted by client device 510 before time T0, but may not have been received by network device 505 before time T0. Furthermore, the SYN-ACK message or data packet may identify a sequence number (SN) of the SYN-ACK message or data packet.

As shown by reference number 530, network device 505 may determine that the SYN-ACK message or data packet has been received before the corresponding SYN message or data packet. For example, network device 505 may perform this determination based on the ACK value identified by the SYN-ACK message or data packet, and also based on the fact that a SYN-ACK packet is a packet from the server, and if the client stream state has not been initialized, which would otherwise have been initialized, if the SYN packet from the client was seen first before the SYN-ACK from the server. Thus, and as shown by reference number 535, network device 505 may determine initial SNs of the client stream and the server stream. For example, network device 505 may determine the SN of the SYN-ACK message or data packet as the initial SN for the server stream, and may use the SN of the yet unseen SYN message or data packet, identified by the ACK value of the SYN-ACK message or data packet, as the initial SN for the client stream. Network device 505 may use the initial SNs of the client stream and the server stream to reassemble or rearrange data packets of the TCP session, as described in more detail elsewhere herein.

As shown by reference number 540, network device 505 may reassemble or rearrange a set of data packets of the TCP session (e.g., as described in more detail in connection with FIGS. 1-3, above). For example, network device 505 may not generate an error, malfunction, or the like when network device 505 receives the SYN-ACK message or data packet before the corresponding SYN message or data packet. To perform reassembly or rearrangement of the set of data packets, network device 505 may determine when a first message or data packet (e.g., on a first stream) is received before a corresponding ACK message or data packet (e.g., on a second stream).

As indicated above, FIG. 5 is provided merely as an example. Other examples are possible and may differ from what was described with regard to FIG. 5.

In this way, a network device (e.g., network device 100, system 300, or network device 505) improves efficiency and resilience of TCP sessions by reassembling or rearranging out-of-order data packets of the TCP session. This may be particularly useful for network devices associated with a multiple RX configuration which uses asymmetric hashing of packets, which can frequently cause out-of-order reception of data packets.

As used herein, the term traffic or content may include a set of packets or data packets. A packet or data packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors to:
receive a plurality of data packets of a Transmission Control Protocol (TCP) session;
determine, based on the plurality of data packets, a state of one direction of a first stream of the TCP session;
generate, based on the state of the one direction of the first stream, a TCP state machine for the TCP session based on one or more values associated with the TCP session;
determine, based on the TCP state machine, that a particular TCP segment, of the TCP session that includes a synchronization acknowledgment (SYN-ACK) flag, has been received before a corresponding TCP segment of the TCP session that includes a synchronization (SYN) flag;
store a sequence number of the particular TCP segment as an initial sequence number for the first stream;
reassemble or rearrange a set of data packets of the TCP session based on the initial sequence number for the first stream and based on one or more sequence numbers of the set of data packets; and
generate an initial sequence number for a second stream based on a value associated with the SYN-ACK flag.

2. The device of claim 1, where the first stream includes at least one of a client stream or a server stream.

3. The device of claim 1, where the TCP state machine identifies at least one of:
the sequence number or the one or more sequence numbers,
the one direction of the first stream,
a last byte sequence number for the first stream,
a last seen ACK value for the first stream, or
a value that indicates a byte value identifying data packets for which reassembly or rearranging have been performed.

4. The device of claim 1, where the device comprises a network interface card.

5. The device of claim 1, where the reassembly or rearrangement is performed based on at least one of a finish flag or a reset flag of the plurality of data packets.

6. The device of claim 5, where the finish flag or the reset flag is used to determine a last byte for which the reassembly or rearrangement is to be performed.

7. The device of claim 1, where the corresponding TCP segment is identified by an acknowledgment value of the particular TCP segment.

8. A method, performed by a network device, to process data packets in a transmission control protocol (TCP) session, the method comprising:
receiving a plurality of data packets;
determining, based on the plurality of data packets, a state of one direction of a first stream of the TCP session;
generating, based on the state of the one direction of the first stream, a modified TCP state machine for the TCP session based on one or more values in at least one data packet of the plurality of data packets, the at least one data packet including a TCP segment;
analyzing the TCP segment of the at least one data packet for one or more flags to generate, based on the modified TCP state machine, a determination that the TCP segment includes a synchronization acknowledgment (SYNACK) flag before another determination that another TCP segment for the TCP session includes a synchronization (SYN) flag;
based on the determination that the TCP segment includes a SYN-ACK flag before the other determination that the other TCP segment for the TCP session includes the SYN flag, storing a sequence number of the TCP segment as an initial sequence number for the first stream;
reassembling a set of the plurality of data packets based on sequence numbers of the set of the plurality of data packets, where the sequence numbers of the set of the plurality of data packets are less than a last acknowledgment sequence number for a corresponding direction; and
generating an initial sequence number for a second stream based on a value associated with the SYN-ACK flag.

9. The method of claim 8, wherein generating the initial sequence number for the second stream comprises:
generating the initial sequence number for the second stream based on an ACK value in the SYN-ACK flag.

10. The method of claim 8, where the other TCP segment is identified based on an ACK value in the TCP segment with the SYN-ACK flag.

11. The method of claim 8, where the modified TCP state machine identifies at least one of:
the sequence number of the TCP segment,
a direction associated with the TCP segment,
a last byte sequence number for at least one stream of the TCP session,
a last seen ACK value for the at least one stream, or
a value that indicates a byte value identifying data packets for which reassembly or rearranging have been performed.

12. The method of claim 8, where the plurality of data packets are received over a plurality of receive rings.

13. The method of claim 8, where the plurality of data packets are received from a tap or span or some form of mirroring between a client device and a server device.

14. The method of claim 8, further comprising:
storing information indicating that the one direction of the first stream is from a server to a client based on the determination that the TCP segment includes the SYN-ACK flag.

15. A non-transitory computer-readable medium storing instructions, the instructions comprising:
one or more instructions that, when executed by one or more processors of a device, cause the one or more processors to:
receive a plurality of data packets of a Transmission Control Protocol (TCP) session;
determine, based on the plurality of data packets, a state of one direction of a first stream of the TCP session;
generate, based on the state of the one direction of the first stream, a TCP state machine for the TCP session based on one or more values associated with the TCP session;
determine, based on the TCP state machine, that a particular TCP segment of the TCP session that includes a synchronization acknowledgment (SYN-ACK) flag has been received before a corresponding TCP segment of the TCP session that includes a synchronization (SYN) flag;
store a sequence number of the particular TCP segment as an initial sequence number for the first stream;
reassemble or rearrange a set of data packets of the TCP session based on the initial sequence number for the first stream and based on one or more sequence numbers of the set of data packets; and
generate an initial sequence number for a second stream based on a value associated with the SYN-ACK flag.

16. The non-transitory computer-readable medium of claim 15, where the one or more instructions, that cause the one or more processors to reassemble or rearrange the set of data packets, cause the one or more processors to:
transmit the corresponding TCP segment before the particular TCP segment.

17. The non-transitory computer-readable medium of claim 15, where the set of data packets are reassembled or rearranged based on a first data packet of the set of data packets including an ACK that identifies a second data packet of the set of data packets.

18. The method of claim 8, further comprising:
generating a second modified TCP state machine for a second direction of the first stream.

19. The device of claim 1, wherein the one or more processors, when generating the initial sequence number for the second stream, are to:
generate the initial sequence number for the second stream based on an ACK value in the SYN-ACK flag.

20. The device of claim 1, wherein the one or more processors are further to: generate a second modified TCP state machine for a second direction of the first stream.

* * * * *